(12) United States Patent
Yu et al.

(10) Patent No.: US 6,365,542 B1
(45) Date of Patent: Apr. 2, 2002

(54) PRESULFURIZATION METHOD OF HYDROGENATION CATALYST

(75) Inventors: Shouzhi Yu; Xiaodong Gao; Ruolei Chen, all of Beijing (CN)

(73) Assignee: China Petrochemical Corporation and Research Institute of Petroleum Processing (CN)

( * ) Notice: Subject to any disclaimer, the term of this patent is extended or adjusted under 35 U.S.C. 154(b) by 0 days.

(21) Appl. No.: 09/490,332

(22) Filed: Jan. 24, 2000

(30) Foreign Application Priority Data

Jan. 25, 1999 (CN) .............................. 99100362

(51) Int. Cl.⁷ ........................... B01J 27/02; B01J 31/00; B01J 27/047; B01J 27/051; B01J 27/049

(52) U.S. Cl. ....................... 502/216; 502/155; 502/167; 502/168; 502/216; 502/219; 502/220; 502/221; 502/222; 502/223

(58) Field of Search ................................ 502/216–223, 502/155, 167, 168

(56) References Cited

U.S. PATENT DOCUMENTS

| | | | | |
|---|---|---|---|---|
| 4,043,942 A | * | 8/1977 | Wilson, Jr. .................. | 502/168 |
| 4,362,649 A | * | 12/1982 | Larson ....................... | 502/168 |
| 4,409,401 A | * | 10/1983 | Murtha ....................... | 568/362 |
| 4,725,569 A | * | 2/1988 | Tuszynski et al. .......... | 502/168 |
| 4,997,801 A | * | 3/1991 | Mitarai et al. .............. | 502/168 |
| 5,017,535 A | * | 5/1991 | Schoonhoven et al. ........ | 502/30 |
| 5,139,983 A | * | 8/1992 | Berrebi et al. .............. | 502/168 |
| 5,162,281 A | * | 11/1992 | Kamo et al. ................. | 502/168 |
| 5,169,819 A | * | 12/1992 | Berrebi ....................... | 502/168 |
| 5,215,954 A | * | 6/1993 | Seamans et al. ............. | 502/216 |
| 5,397,756 A | * | 3/1995 | Dufresne et al. ............ | 502/168 |
| 5,654,252 A | * | 8/1997 | Dufresne et al. ........... | 502/220 |
| 5,817,709 A | * | 10/1998 | Szita et al. .................. | 502/168 |
| 5,914,290 A | * | 6/1999 | Shi et al. .................... | 502/228 |
| 6,071,402 A | * | 6/2000 | Danot et al. ................ | 208/112 |
| 6,077,803 A | * | 6/2000 | Dufresne et al. ............. | 502/33 |

* cited by examiner

Primary Examiner—Mark L. Bell
Assistant Examiner—Patricia L. Hailey
(74) Attorney, Agent, or Firm—Jenkens & Gilchrist

(57) ABSTRACT

A presulfurization method of hydrogenation catalyst comprises mixing an olefin-containing component, elemental sulfur and a promoter, heating the resultant mixture at 100–120° C. for more than 0.5 hours, wherein the mole number of elemental sulfur is at least not less than that of double bonds of the olefin, and the amount of the promoter used is 10–80% weight of the amount used of elemental sulfur, and said promoter is selected from an organic promoter used usually in rubber curing; the elemental sulfur-incorporated catalyst is impregnated with the product obtained, and heated at 100–300° C. in an inert atmosphere for more than 1 hour; wherein the volume amount of said product used is at least 60% of the pore volume of the catalyst. In the case of a little amount of the promoter being used, the presulfurization method can improve greatly the sulfur retention degree of the catalyst.

16 Claims, No Drawings

PRESULFURIZATION METHOD OF HYDROGENATION CATALYST

FIELD OF THE ART

The present invention relates to a method for the presulfurization of a hydrogenation catalyst.

BACKGROUND OF THE INVENTION

The conventional method for presulfurizing hydrogenation catalysts is an in-situ (inside reactor) method of presulfurization, comprising: placing a catalyst having hydrogenation-active metal in oxidation state in a reactor and presulfurizing the catalyst at a high temperature by passing through hydrogen and hydrogen sulfide or hydrogen and a straight fraction oil containing carbon disulfide and dimethyl disulfide to convert the hydrogenation-active metal into sulfurization state. The in-situ method of presulfurization has the disadvantages of higher production costs, prolonged time for presulfurization and flammable and poisonous sulfides being used, thus causing environmental pollution.

Another method for presulfurizing hydrogenation catalysts is ex-situ (outside reactor) method of presulfurization, which means combining a hydrogenation catalyst and a vulcanizing agent prior to loading them into the reactor, then only introducing hydrogen or hydrogen and oils simultaneously to start up the presulfurization, and subsequently raising the temperature, thus completing the sulfurization activation process. Since the ex-situ method of presulfurization has advantages of simple operation, high efficiency and non-pollution, this method is used widely. In this ex-situ method of presulfurization, the vulcanization agent usually used is elemental sulfur and/or organic polysulfides.

In U.S. Pat. No. 4,089,930, a hydrotreating process of hydrocarbon raw materials is disclosed, which comprises contacting the hydrocarbon raw material with hydrogen and a hydrotreating catalyst as an elevated temperature to remove sulfur, nitrogen and oxygen there from, the improvement lies in that a sulfurized catalyst is used in the process, wherein said catalyst is obtained by presulfurizing the catalyst supported with metal oxides in the following steps: contacting the supported catalyst of metal oxides with elemental sulfur in the absence of hydrogen to allow at least a part of said elemental sulfur entering the pores in the catalyst. The sulfur-incorporated catalyst is contacted with hydrogen at 200~600° C. The method has advantages of low cost and high efficiency. However, since it is the nature of elemental sulfur to sublime easily and to be dissolvable in raw material oil, if there is no protective measure, the elemental sulfur in the catalyst will be very easily stripped off upon start-up, and as a result the catalyst can not be completely sulfurized and thus the catalyst will not have sufficient activity, and excessive sulfur will exist in the products. In some case as sulfur is stripped off, elemental sulfur will be condensed in the pipes downstream the apparatus to cause a sudden stop for blocked pipelines in production. Thus, it can be seen that, how to increase the sulfur retention degree in catalyst is a key problem which should be solved before commercial application of the ex-situ method of presulfurization when elemental sulfur is used as a vulcanizing agent.

To solve this problem of sulfur being stripped off, in EP 359,356 A1 two presulfurization methods of hydrotreating catalysts are proposed. One comprises: (1) contacting the catalyst with a powdered elemental sulfur at a temperature lower than 210° F. (about 99° C.) to allow said elemental sulfur entering essentially the pores in the catalyst to form a mixture; and (2) heating said mixture to a temperature in the range of higher than the melting point of elemental sulfur and below 390° F. (about 199° C.) in absence of hydrogen. Another one comprises (1) contacting the catalyst with a powdered elemental sulfur at a temperature lower than 210° F. (about 99° C.) to allow said elemental sulfur entering essentially the pores in the catalyst to form a mixture; and (2) mixing said mixture with at least one substance selected from a hydrocarbon solvent and an oil having a high boiling range to form a prewetted mixture, and the method also comprises further heating said prewetted mixture to a temperature higher than the melting point of sulfur. Using these methods mentioned above, the stripping loss of sulfur is decreased, and thus the retention degree of sulfur is increased.

In U.S. Pat. No. 5,215,954, two presulfurization methods of the catalyst containing metal oxides are disclosed, the first one comprises (1) contacting said catalyst with elemental sulfur by sublimation and/or melting at such a temperature as to allow said elemental sulfur entering essentially the pores in the catalyst, (2) heating the sulfur-incorporated catalyst at a temperature higher than 150° C. in the presence of liquid olefin. The second method comprises contacting said catalyst with the mixture of a powdered elemental sulfur and a liquid olefin, and heating the resultant mixture to above 150° C. By this method, stripping loss of sulfur is further decreased, and the retention degree of sulfur is increased.

In U.S. Pat. No. 5,681,787, a presulfurization method of hydrogenation catalyst particles containing at least one metal or metal oxide is disclosed, wherein the method comprises (1) contacting said catalyst with elemental sulfur at such a temperature as to allow at least a part of said elemental sulfur entering the pores in the catalyst, (2) contacting said catalyst with at least one of oxygen-containing hydrocarbons having at least 12 carbon atoms to obtain a catalyst having a decreased autothermicity.

Although the retention degree of sulfur is increased to a certain extent by using various methods mentioned above, it is still far from being enough.

CN 85107953A discloses a presulfurization method of catalyst, wherein said catalyst comprises at least one metal or non-metal oxide carrier and at least one active metal, in the first reaction stage, said catalyst is treated with at least one vulcanizing agent at 0–50° C. in the absence of hydrogen to allow the vulcanizing agent to permeate partially or completely through the pores in the catalyst, in which said vulcanizing agent is a polysulfide having a general formula as follows: R—S(n)—R', wherein n is a number in the range of 3–20, R' represents a hydrogen atom or other group similar or not similar to R group, both said groups represent respectively an organic group having 1–150 carbon atoms and may be one selected from the group consisting of saturated or unsaturated linear, branched or cyclic alkyl group, aryl group, alkylaryl group and arylalkyl group, and the vulcanizing agent is used in the form as it is dissolved in a solvent. Then the catalyst is subjected to drying treatment. Thereafter in the second reaction stage, the treated catalyst from the first reaction stage is further treated in the following procedures: (1) treating the catalyst in the absence of hydrogen but in the presence of an inert or non-inert gas at a temperature of 65–275° C. and a pressure of 0.5–70 bar for at least 5 minutes, then (2) treating the catalyst further at a temperature of at least 275° C. for at least 1 minute.

U.S. Pat. No. 5,139,990 discloses a preparation method of a catalyst for hydrotreating hydrocarbon raw materials, wherein the method comprises (1) preparing a catalyst which comprises a carrier material onto which one or more active metal or metal compounds for hydrotreating the hydrocarbon raw materials are deposited; (2) contacting the catalyst from the step (1) with a liquid medium containing an organic sulfur compound to introduce an effective amount of the organic sulfur compound into the catalyst, said organic sulfur compound is one selected from the group consisting of a salt of ethylene bis-(dithio carbamic acid), a salt of 2,5-dimetacapto-1,3,4-thiobiazole, thiourea, ammonium thiocyanate, dimethyl sulfoxide, 3,4-dithiaadipate 2,2'-dithioethylene glycol.

In both methods mentioned above, organic compounds of sulfur are used as the vulcanizing agent, but in the ex-situ method of presulfurization, there is a tendency to use elemental sulfur as the vulcanizing agent, because, compared with elemental sulfur, the vulcanizing agent used in both methods mentioned above are very expensive in price, and thus using in a large amount of the expensive organic sulfur compounds results in increasing the cost of the presulfurization method, therefore it is disadvantageous to commercial application.

CN 1082591A discloses a method for treating the catalyst containing at least one of metal or non-metal oxides and at least one of active metals, in said method at least one vulcanizing agent is used for treating the catalyst, said vulcanizing agent is one selected from the group consisting of elemental sulfur and an organic sulfur compound having a general formula of R—S(n)—R', wherein n is a number of 3–20, R and R' may represent same, or different groups, each having 1–150 carbon atoms in molecule, selected from the group consisting of saturated or unsaturated, linear or branched alkyl, aryl, alkylaryl and arylalkyl group, R' may also represent a hydrogen atom. In said method a mixture solvent is added to dilute the vulcanizing agent and said mixture solvent comprises further at least one component of olefin-containing carbon chain. In the method, the vulcanizing agent used is elemental sulfur, polysulfide or a mixture thereof. If the vulcanizing agent used is solely elemental sulfur, there will be no difference between this method and U.S. Pat. No. 5,215,954 and U.S. Pat. No. 5,681,787. If only polysulfide is used as the vulcanizing agent, still the disadvantage of expensive price is inevitable. However, if a mixture of the two is used as the vulcanizing agent, the sulfur content from the polysulfide is about 5–75 wt %, preferably 20–60 wt %, more preferably 25–50 wt % of the mixture of polysulfide and elemental sulfur, the amount of polysulfide used is still relatively high. Furthermore, when a mixture of the two is used as the vulcanizing agent, the increase in the sulfur retention degree is not enough.

SUMMARY OF THE INVENTION

The object of the present invention is to provide a new presulfurization method of hydrogenation catalyst which is able to increase further the sulfur retention degree in the catalyst.

The presulfurization method of hydrogenation catalyst according to the present invention comprises contacting said catalyst with elemental sulfur at a temperature to allow said elemental sulfur substantially incorporated into the pores of the catalyst by the subliming and/or melting process, said method comprises further (1) mixing a olefin-containing component, elemental sulfur and a promoter, and heating the resultant mixture at 100~220° C. for more than 0.5 hour, wherein the mole number of elemental sulfur is not less than the mole number of double bond of the olefin, and the amount of the promoter used is 10–80 wt % of the elemental sulfur used, and said promoter is one or more organic promoters usually used in rubber curing; (2) impregnating the sulfurized olefin-containing product obtained from the step (1) onto the elemental sulfur-incorporated catalyst, and heating the catalyst at 100~300° C. in an inert atmosphere for more than 1 hour, wherein the volume amount of the sulfurized olefin-containing product is at least 60 vol % of pore volume of the catalyst.

DESCRIPTION OF THE INVENTION IN DETAIL

According to the method of the present invention, said hydrogenation catalyst is a hydrotreating catalyst (for hydrodesulfurization, hydrodenitrogenation and hydrodearomatization) comprising heat-refractory inorganic oxides (such as alumina, silica, alumina-silica) as a carrier on which one or more oxides of the metals selected from the elements of GVIII or GVIB in the periodic table of elements are supported, or a hydrocracking catalyst comprising zeolites and heat-refractory inorganic oxides as a carrier, on which one or more oxides of metals selected from the elements of GVIII or GVIB in the periodic table of elements are supported. The Preferred hydrogenation catalyst is a hydrotreating catalyst (for hydrodesulfurization, hydrodenitrogenation, hydrodearomatization) comprising heat-refractory inorganic oxides (such as alumina, silica, alumina-silica) as a carrier on which one or two compound (s) selected from nickel and/or cobalt oxides and one or two selected from molybdenum and/or tungsten oxides are supported, or a hydrocracking catalyst comprising zeolite and heat-refractory inorganic oxides as a carrier on which one or two compound(s) selected from nickel and/or cobalt oxides and one or two compound(s) selected from molybdenum and/or tungsten oxides are supported. Said catalysts may further comprise a cocatalyst component such as fluorine, phosphor, boron and the like.

Said step of contacting the catalyst with elemental sulfur by the sublimitation and/or melting process is carried out by conventional method, that is, by heating the mixture of catalyst sample and elemental sulfur to a temperature higher than 80° C., preferably 80~445° C., more preferably 90~130° C., then keeping the temperature constant for more than 0.5 hour, preferably 0.5~5 hours. The amount of elemental sulfur used depends on the amount of metal to be sulfurized in the catalyst. Generally speaking, the amount of elemental sulfur used is 50~150 wt % of stoichiometric value in presulfurization, preferably 90~140 wt % of the stoichiometric value. For example, in the case of a catalyst containing 24.5 wt % of tungsten oxide, 2.5 wt % of nickel oxide, the sulfides formed in the sulfurization are $WS_2$ and $Ni_3S_z$, the stoichiometric value is 7.5 g sulfur/100 g catalyst. Thus, the amount of elemental sulfur used is 3.75~11.25 g sulfur/100 g catalyst, preferably, 6.25~10.5 g sulfur/100 g catalyst.

Said olefin-containing component may be one or more selected from pure liquid monoene, diene and polyene, and said monoene, diene and polyene may be a linear, branched or cyclic olefin. Said olefin is preferably an olefin having 5~30 carbon atoms. Said olefin-containing component may contain other hydrocarbon components, such as one or more selected from alkane, cycloalkane and aromatic hydrocarbon, and in said olefin-containing component, olefin content is 30~100 wt %. In order to reduce the costs, the fraction oil containing olefin can be used as the olefin-containing component, provided that the olefin content is at least 30 wt %, and other main components in the fraction oil are preferably alkane or cycloalkane with low toxicity. In order to reduce further the costs, said olefin-containing component can be selected from the fraction oils having a boiling range of 170~350° C. and an olefin content of 50~90 wt %, originated from wax cracking.

Said promoter is one or more conventional organic promoters used in rubber curing. These conventional promoters are described in detail in the "Promoters Handbook in Plastics and Rubbers", pp 458–536, Chief-editor Lui Si-guang, China Light Industry Press, 1995. Said promoter is preferably one or more metal-free organic promoters used in rubber curing, in which it is more preferably as follows:

(1). tetramethylthiuram disulfide having the formula:

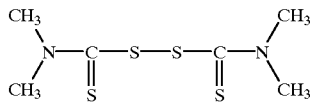

(2). tetraethylthiuram disulfide having the formula:

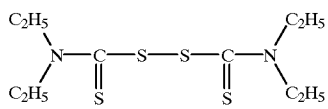

(3). tetramethylthiuram sulfide having the formula:

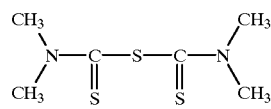

(4). tetramethylthiuram tetrasulfide having the formula:

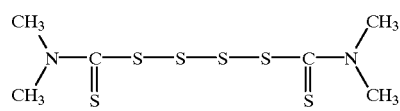

(5). 2-mercapto benzothiazole having the formula:

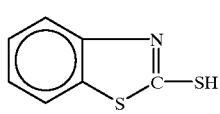

(6). dibenzothiazole disulfide having the formula:

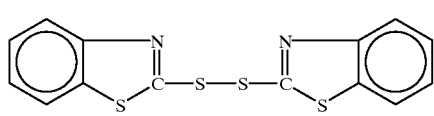

(7). N,N-diisopropyl-2-benzothiazole sulfenamide having the formula:

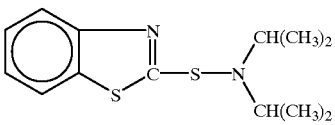

(8). N-tert-butyl-2-benzothiazole sulfenamide having the formula:

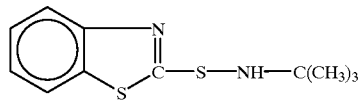

(9). N,N-dicyclohexyl-2-benzothiazole sulfenamide having the formula:

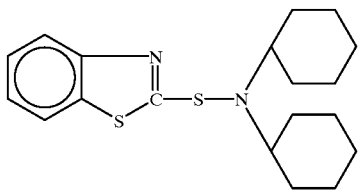

(10). N,O-di(1,2-ethylene)-2-benzothiazole sulfenamide having the formula:

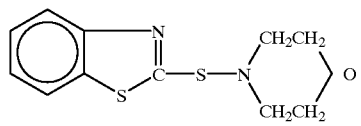

(11). 1,2-ethylene thiourea having the formula:

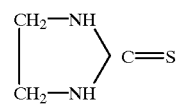

(12). N,N-di-n-butyl thiourea having the formula:

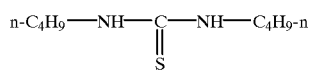

(13). diphenyl thiourea having the formula:

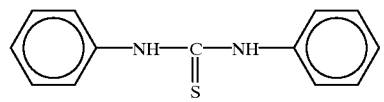

(14). dithio-di-n-butyl xanthic acid having the formula:

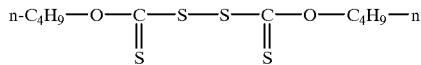

(15). diphenylguanidine having the formula:

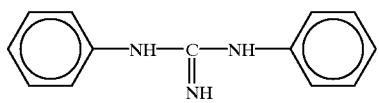

(16). di-o-tolylguanidine having the formula:

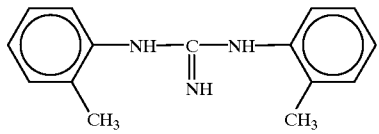

(17). triphenylguanidine having the formula:

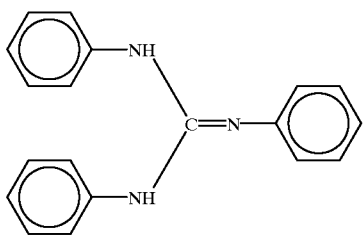

(18). N,O-di(1,2-ethylene)thiocarbamyl-N,O-di(1,2-ethylene)sulfenamide having the formula:

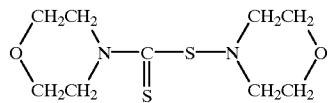

According to the method of the present invention, the amount of said promoter used is 10~80 wt %, preferably 10~50 wt %, of the amount of elemental sulfur used in the reaction mixture of the olefin-containing component, elemental sulfur and promoter. Since the elemental sulfur contained in the reaction mixture of the olefin-containing component elemental sulfur and promoter makes up only a small part of the amount of elemental sulfur used in the reaction, the amount of sulfur form the promoter accounts for no more than 7 wt %, preferably no more than 4 wt %, of the total amount of sulfur used in the reaction.

Said heating temperature, after the olefin-containing component, elemental sulfur and promoter are mixed is preferably 130~210° C., more preferably 150~190° C., while the heating time is preferably 0.5~5 hours. The amount of said promoter used is preferably 10~50 wt % of the amount of elemental sulfur used.

When impregnating the elemental sulfur-incorporated catalyst with the sulfurized olefin-containing product, the amount of the sulfurized olefin containing product used is preferably 60~150 vol % of the pore volume of the catalyst. In order to maintain the catalyst in a dry state to facilitate the heat treatment in the next step, the amount of the sulfurized olefin-containing product used is preferably 75~95 vol % of the pore volume of the catalyst.

Said inert atmosphere refers to any atmosphere which does not react with said elemental sulfur and metal, such as Helium, Neon, Argon, Nitrogen and carbon dioxide atmospheres and so on, of which the Nitrogen atmosphere is preferred. Said inert atmosphere may be an inert atmosphere in flowing state, or in static state. Preferably, said inert atmosphere is one in static state, i.e. the heating treatment of the impregnated catalyst with the sulfurized olefin-containing product is carried out in said inert atmosphere under closed condition. Said inert atmosphere may be at an atmospheric pressure, or a pressure lower or higher than the atmospheric pressure, but preferably the atmospheric pressure or a pressure higher than the atmospheric pressure, more preferably the process is carried out under 0.1~5 MPa.

Said heating temperature for treating the catalyst in an inert atmosphere is preferably 150~300° C. while the treatment time is preferably for 2~5 hours.

According to the method of the present invention, the catalyst obtained by the presulfurization of the catalyst should be activated prior to use to convert the metal oxides active for hydrogenation in the catalyst into sulfurization state. The conventional method may be used for activation of the catalyst, i.e. the catalyst is contacted with hydrogen at a temperature higher than 200° C., preferably 200~425° C., for at least 0.5 hour, preferably 0.5 hour~3 days. The activation method of the catalyst may also be carried out in the presence of hydrogen by heating gradually the catalyst to a temperature required for reactions of hydrodesulfurization, hydrodenitrogenation or hydrocracking, generally at a temperature between 200° C. and 450° C.

Compared with the prior art, the presulfurization method of hydrogenation catalysts according to the present invention has the advantages as follows:

(1) After being treated in an inert atmosphere at the same temperature, the sulfurized catalyst provided according to the present invention can be maintained at a higher level of sulfur retention compared with the catalyst of the prior art. Furthermore, if it is desired to achieve the same level of sulfur retention, the treatment temperature required in the method according to the present invention is lower than that of the prior art.

For example, after a hydrotreating catalyst containing oxides of nickel and tungsten was presulfurized according to the method of the present invention, it was finally treated in an inert atmosphere at 205° C. for 3 hours to obtain a catalyst having a sulfur content of 4.22 wt %, then sulfur in the resultant catalyst was extracted with acetone under refluxing condition for 18 hours, the extracted catalyst had a sulfur level of 3.74 wt % and a sulfur retention degree of 88.6 wt %. However, as disclosed in U.S. Pat. No. 5,215,954, when the same olefin-containing components were used for the presulfurization of catalyst in the inert atmosphere at the same temperature for the same period of time, and the same method was used to carry out the acetone extraction test of the catalyst, the sulfur contents in the catalyst before and after extraction were reduced from 3.25 wt % to 2.00 wt %, and the sulfur retention degree with acetone extraction was only 61.5 wt %.

Also, for example, after a catalyst was presulfurized according to the method of the present invention, it was finally treated in an inert atmosphere at a temperature of 190° C. to obtain, a presulfurized catalyst having a sulfur content of 5.97 wt %, then the acetone extraction test was carried out by the same method, the extracted catalyst had a sulfur content of 3.70 wt % and its sulfur retention degree was 62 wt %. These results were similar to that (60.5 wt %) by the method disclosed in U.S. Pat. No. 5,215,954 in which the treatment temperature in an inert atmosphere was at 205° C.

Further, for example, decene (containing 98 wt % of α-$C_{10}$ olefin), powdered elemental sulfur and powder promoter of tetramethylthiuram disulfide were first reacted by the method according to the present invention, then the catalyst containing elemental sulfur was impregnated with the sulfurized olefin-containing product formed in the reaction, and heat-treated to obtain a presulfurized catalyst. Thereafter, the same acetone extraction test of the obtained catalyst was carried out, the sulfur contents of the catalyst before and after the extraction were respectively 5.61 wt % and 5.45 wt %, and the sulfur retention degree was 97.1 wt %. But in contrast, according to the results shown in Table 2 disclosed in U.S. Pat. No. 5,215,954, in which no promoter was added and similar olefin was used directly to treat the catalyst according to the method of U.S. Pat. No. 5,215,954, the sulfur retention degree was only 92.2 wt %.

(2) The raw materials used by the method according to the present invention are cheap elemental sulfur, olefin and a small amount of promoter, and the promoter used was in a quantity much less than that used in the prior art, therefore, the cost for the presulfurization process has been reduced remarkably while the sulfur retention degree is improved significantly.

(3) The catalyst presulfurized according to the method of the present invention has relative high catalytic activity. For example, having been presulfurized by the method according to the present invention, the hydrotreating catalyst has the hydrodesulfurization and hydrodenitrogenation activities similar to that of the presulfurized catalysts obtained by the in-situ method of presulfurization.

EXAMPLES

The following examples are intended to illustrate the present invention in detail.

Example 1

Presulfurization of the catalyst was carried out according to the method of the present invention.

(1) 300 g of dry commercial catalyst CH-7 (containing 2.5 wt % of nickel oxide, 24.5 wt % of tungsten oxide, 4.5 wt % of fluorine and the balanced of alumina, in trilobular extruded shape, 1.2 mm incircumscribed diameter and 3~8 mm in length, manufactured by the Catalyst Factory of Changling General Refinery) and 30 g of powdered sulfur were packed in a long-necked flask, in which air was displaced off and purged with nitrogen, then the mouth of the flask was sealed. The long neck was fixed onto a motor shaft, the flask was horizontally inserted into a drying oven, the motor was turned on, and adjusted to a speed of 10 r.p.m, and the temperature was raised to 110° C. at a rate of 6° C./min and maintained at this temperature for 1 hour and then decreased, to obtain 330 g of element sulfur-containing catalyst. The sulfur-containing catalyst had a pore volume (in water method) of 0.31 ml/g.

(2) 200 g of olefin originated from wax-cracking (containing 30.5 wt % of alkane, 62.8 wt % of monoene, 6 wt % of diene, and 0.7 wt % of aromatic hydrocarbon, having a boiling range of 220~350° C., a specific gravity of 0.786 g/cm$^2$ at 20° C., an average molecular weight of 220, "蜡裂解烃" available from No.2 Chemical Plant, the Yanshan Petrol-chemical Co., Ltd. and the amount of elemental sulfur used was 10 g elemental sulfur/90 g olefin from wax cracking process, based on the molar ratio of double bonds of olefin to elemental sulfur=1), 25 g of powdered elemental sulfur and 12 g of a powdered promoter of dibenzothiazole disulfide were packed in a flask, then the flask was heated in an oil bath to 180° C. and maintained at the temperature for 1 hour to obtain a liquid product containing sulfurized olefin, which had a sulfur content of 12.5 wt % (the elemental sulfur was reacted completely and incorporated the liquid product). The sulfur content was determined by using SLFA-920 Type X-ray Sulfurmeter.

(3) 100 g of the elemental sulfur-incorporated catalyst prepared by step (1) was packaged into a flask, then 26 ml of the sulfurized olefin-containing product prepared by step (2) (having a specific gravity of 0.88 g/ml at 20° C.) was added to the flask and stirred homegeneous, the resultant product was added to a quartz tube reactor and treated at a constant temperature of 205° C. in flowing nitrogen atmosphere under the atmospheric pressure for 3 hours, then the temperature was decreased to room temperature, a presulfurized catalyst was obtained and marked as $C_1$.

Wherein, the amount of sulfur used from the promoter is calculated as the following:

The content of elemental sulfur in the catalyst prepared in step (1) was 9.09 wt %, thus 100 g of the catalyst contained 9.09 g of elemental sulfur. In 26 ml (corresponding to 22.9 g) of the product obtained in step (2), the sulfur from the elemental sulfur was 2.416 g, and the sulfur from the promoter was 0.447 g, thus the amount of sulfur used from the promoter was 0.447/(0.446+2.416+9.09)=3.7 wt %.

Comparative Example 1

The presulfurization of catalyst was carried out according to the method described in U.S. Pat. No. 5,215,954.

100 g of the elemental sulfur-incorporated catalyst prepared in Example 1 was packed in a flask, 26 ml of said wax-cracking olefin in Example 1 was added into the flask and stirred homogeneous. The obtained product was added into a quartz tube reactor and treated at a constant temperature of 205° C. in a flowing atmosphere of nitrogen at atmospheric pressure for 3 hours, then the temperature was decreased to room temperature, a presulfurized catalyst as a reference catalyst was obtained and marked as $B_1$.

Comparative Example 2

The presulfurization of catalyst was not carried out by the method of the present invention.

(1) The catalyst containing elemental sulfur was prepared according to the method used in step (1) of Example 1.

(2) 26 ml of said wax-cracking olefin in Example 1, 2.4 g of elemental sulfur, 1.15 g of the powdered promoter of dibenzothiazole disulfide, and 100 g of the catalyst containing elemental sulfur were mixed together. The resultant mixture was added into a quartz tube reactor and treated at a constant temperature of 205° C. in a flowing atmosphere of nitrogen at atmosphere pressure for 3 hours, then the temperature was decreased to room temperature, a presulfurized catalyst was obtained and marked as $B_2$.

Comparative Example 3

The presulfurization of catalyst was not carried out by the method of the present invention.

The presulfurization of catalyst was carried out by the method described in Example 4 of CN 1082591, except that the catalyst used was 100 g of said commercial catalyst CH-7 used in Example 1 of the present invention, the amount of TPS 37 used was 5.5 g, and the amount of elemental sulfur used was 6.16 g (the sulfur from TPS 37 accounted for 24.8 wt % of the total sulfur content) to obtain the catalyst which was marked as $B_3$.

Example 2

The presulfurization of the catalyst was carried out according to the method of the present invention.

The presulfurization was carried out by the same method as that in Example 1, except that in the step (3), the treatment temperature in the nitrogen atmosphere was 190° C. to obtain the catalyst which was marked as $C_2$.

Example 3

The presulfurization of the catalyst was carried out according to the method of the present invention.

The presulfurization was carried out by the same method as that in Example 1, except that the amount of the powdered elemental sulfur used in the step (1) was 15 g. In the step (2), the amount of elemental sulfur used was 27 g, the amount of the promoter dibenzothiazole disulfide used was 6 g, and the sulfur content in the liquid product of sulfurized olefin obtained in step (2) was 12.5 wt %. In the step (3), the amount of sulfurized olefin added was 29 ml. The treatment temperature in nitrogen atmosphere was 120° C. and treatment time was 2 hours, the nitrogen atmosphere was a sealed atmosphere having a pressure of 0.1 MPa. After being treated in nitrogen atmosphere, the catalyst was placed in a reactor and treated in hydrogen atmosphere at a temperature of 190° C. for 1 hour, the hydrogen atmosphere has a pressure of 3.2 MPa, the catalyst was obtained and marked as $C_3$.

According to the same calculation method as that in Example 1, the amount of sulfur used from the promoter was about 3.1 wt % of the total amount of sulfur used.

Example 4

The presulfurization of catalyst was carried out according to the method of the present invention.

160 g of decene (containing 98 wt % of $\alpha$-$C_{10}$ olefin), 39 g of powdered elemental sulfur and 6 g of powdered tetramethylthiuram disulfide promoter (1st grade) were packed in a flask, the flask packed was heated in an oil bath to 160° C. and maintained at the temperature for 2 hour, then a liquid product containing sulfurized olefin was obtained, in which sulfur content was 17.1 wt %.

100 g of the elemental sulfur-incorporated catalyst prepared by step (1) in Example 1 was packed into a beaker, then 26 ml of the sulfurized olefin-containing product was added to the flask and stirred homogeneous, the resultant product was added to a quartz tube reactor and treated at a constant temperature of 205° C. in flowing atmosphere of nitrogen at atmospheric pressure for 3 hours, then the temperature was decreased to room temperature, a presulfurized catalyst was obtained and marked as $C_4$.

According to the same calculation method as that in Example 1, the amount of sulfur used from the promoter was about 2.9 wt % of the total amount of sulfur used.

Example 5

Acetone Extraction Test 400 ml of acetone was added to a 500 ml of flask at the bottom of a fatty extractor, 10 g of the catalyst $C_1$ was placed into a stainless steel wire basket, then the mouth of the basket was sealed and placed into an extracting tube in the middle of the extractor, finally a top condenser was mounted on the fatty extractor. The acetone was heated to its boiling point and refluxed for 18 hours. The stainless steel wire basket was drawn out, and the extracted catalyst was dried at 40° C. for 6 hours, and then analyzed to determine sulfur level. The sulfur contents and sulfur retention degrees of the catalysts before and after reaction are shown in Table 1, wherein the sulfur contents of the catalysts were determined by a CS-444 Type Sulfur-Carbonmeter.

Comparative Examples 4–6

Acetone Extraction Test

The acetone extraction test was carried out according to the same method as that in Example 4, except that the catalysts $B_1$, $B_2$ and $B_3$ were used instead of the catalyst $C_1$. the results are shown in Table 1.

Examples 6–8

Acetone Extraction Test

The acetone extraction test was carried out by the same method as that in Example 4, except that the catalysts $C_2$–$C_4$ were used instead, the results are shown in Table 1.

TABLE 1

| Example No. | Catalyst No. | Sulfur content before the test wt % | Sulfur content after the test wt % | Sulfur retention degree wt % |
|---|---|---|---|---|
| 5 | $C_1$ | 4.22 | 3.74 | 88.6 |
| Comp. 4 | $B_1$ | 3.25 | 2.00 | 61.5 |
| Comp. 5 | $B_2$ | 3.41 | 2.09 | 61.2 |
| Comp. 6 | $B_3$ | 5.33* | 2.14* | 40.1 |
| 6 | $C_2$ | 5.97 | 3.70 | 62.0 |
| 7 | $C_3$ | 6.21 | 3.92 | 63.1 |
| 8 | $C_4$ | 5.61 | 5.45 | 97.1 |

Note: *Since TPS 37 dissolves in acetone, thus the sulfur contained in TPS 37 is not counted in the sulfur content, correspondingly, the sulfur retention degree refers only to that of the elemental sulfur in $B_3$, if the sulfur in TPS 37 is counted in, the sulfur retention degree will be less.

It can be seen from the results shown in Table 1 that:

(1) The sulfur retention degrees of catalysts sulfurization according to the method of the present invention can be maintained at a higher level when the treatment in an inert atmosphere is carried out at the same temperature level. However, in order to achieve the same level of the sulfur retention degree, the treatment by the method according to the present invention can be carried out at a still lower temperature.

(2) According to the method of the invention, the treatment can be carried out at a temperature as low as 120° C. and the catalyst is thermally treated prior to use in a hydrogen atmosphere (the catalyst being activated by an activation process), a similar sulfur retention degree can be achieved as that of the catalyst which is treated at higher temperature in an inert atmosphere.

(3) In the presulfurization of the catalyst according to the method provided by the present invention, only a very small amount of the sulfurization promoter (the amount of sulfur from the promoter accounts for 2.9–3.7 wt % of the total amount of sulfur) is used, the stability of the incorporated sulfur is much superior to that of the prior art. For example, its result is much better than that of the prior art when the amount of polysulfide used is 24.8 wt % of the total amount of sulfur used.

In the method described in the present invention, the property of the product formed by the reaction of olefin with elemental sulfur and sulfurization promoter is critical to achieving the present invention. Supposedly, the sulfur existing in said product in a form of sulfurized olefin plays an important role, the higher the content of sulfur existing in the form of sulfurized olefin in the product, the higher the sulfur retention degree of the sulfurized catalyst. In order to prove this point, the following experiments were carried out.

Example 9

This example shows the sulfur content existing in the liquid product in the form of sulfurized olefin when the olefin, elemental sulfur and promoter are used as raw materials and reacted according to the invention. Since the structure of sulfurized olefin is complex, the sulfur content of the liquid product represents the relative content of sulfurized olefin in order to simplify the analysis.

13 ml of wax-cracking olefin (the same as that used in Example 1), 2 g of powdered elemental sulfur and 1 g of powdered promoter of tetramethylthiuram disulfide (commercial name: TMTD, $C_6H_{12}N_2S_4$) were added to a flask, then the flask packed with olefin, sulfur and promoter was heated in an oil bath at 180° C. and maintained at the temperature for 1 hour, to obtain a liquid product containing sulfurized olefin, of which the sulfur content is shown in Table 2.

Comparative Example 7

This comparative example shows the sulfurized olefin content in the liquid reaction product, represented by sulfur content, when the reaction is carried out not with the raw materials used in the present invention.

The reaction product was prepared by the same method as that in Example 9, except that no promoter was added. The sulfur content of the product obtained is shown in Table 2.

Comparative Examples 8–9

These comparative examples show the sulfurized olefin contents in the liquid products, represented by sulfur content, when the reaction was carried out not by using the raw materials used in the present invention.

The reaction product was prepared by using the same method as that in Example 9, except that equal quantities of non-rubber curing promoter Rhodanine ($C_3H_3NOS_3$) and ditetranonylpolysulfie bearing the commercial name of TPS-37 were used respectively instead of tetramethylthiuram disulfide. The sulfur contents of the product obtained are shown in Table 2.

TABLE 2

| Example No. | Promoter | Sulfur content, wt % |
|---|---|---|
| 9 | TMTD | 12.3 |
| Comp. 7 | — | 4.2 |
| Comp. 8 | Rhodanine | 5.0 |
| Comp. 9 | TPS-37 | 6.1 |

The results in Table 2 show that, compared with the reaction product obtained without adding any promoter, in the reaction products when Rhodanine or TPS-37 was added, the sulfurized olefin contents in the liquid products were not increased obviously, however, when TMTD was added the content of sulfurized olefin in the liquid product was 2.93 times the sulfurized olefin of that in which no promoter was added, and were 2.46 and 2.02 times respectively the sulfurized olefin contents of those in which Rhodanine and TPS-37 were added.

Examples 10~11

The following Examples are intended to illustrate the reaction performance of the catalysts which are presulfurized by using the method according to the present invention.

100 ml of catalyst $C_2$ prepared in Example 4 was added to the reactor of a pilot reaction apparatus to carry out the gas phase activation of the catalyst, i.e. hydrogen was incorporated with a space velocity of 150 $hr^{-1}$, and the temperature was increased slowly to the reaction temperature for carrying out the activation of the catalyst. The catalytic cracking diesel containing 5100 ppm of sulfur and 845 ppm of nitrogen was used as the raw material to evaluate the activity of the catalyst at a reaction temperature of 330° C. or 350° C., a partial pressure of hydrogen of 3.2 MPa, a LHSV of 2.0 $h^{-1}$ and a H/Oil volume ratio of 350. The reaction results are shown in Table 3

Comparative Examples 10~11

These comparative examples are intended to illustrate the catalytic performance of the catalysts which are presulfurized by the in-situ method of presulfurization of prior art.

100 ml of said catalyst CH-7 in Example 1 was added to a 100 ml reactor of a pilot reaction apparatus, the straight kerosene containing 2 wt % of carbon disulfide was passed through the reactor, at a space velocity of 2 $h^{-1}$, a H/Oil volume ratio of 300 and a temperature of 290° C. to carryout the presulfurization of catalyst for 6 hours. The catalytic performance of the catalyst was evaluated under the same conditions with the same raw materials as those in Examples 7~8, the results are shown in Table 3.

TABLE 3

| Example No. | Catalyst No. | Reaction temperature ° C. | Proportion of desulfurization wt % | Proportion of denitrogenation wt % |
|---|---|---|---|---|
| 7 | $C_2$ | 330 | 91.1 | 67.6 |
| 8 | $C_2$ | 350 | 96.1 | 76.2 |
| Comp. 10 | — | 330 | 91.1 | 67.5 |
| Comp. 11 | — | 350 | 96.3 | 76.3 |

The results in Table 3 show that the desulfurization and denitrogenation activities of the catalysts presulfurized by the method according to the present invention are corresponding to those of the catalysts presulfurized by using the in-situ method of presulfurization.

What is claimed is:

1. A method of presulfurizing a hydrogenation catalyst comprising contacting said catalyst with elemental sulfur at such a temperature as to allow said elemental sulfur incorporating substantially into the pores in said catalyst by sublimation and/or melting, where in said method comprises further (1) mixing an olefin-containing component, elemental sulfur and a promoter, and heating the resultant mixture at 100–220° C. for 0.5 hour or more, wherein the mole number of elemental sulfur is not less than the mole number of double bond of the olefin, and the amount of the promoter used is 10–80 wt % of that of elemental sulfur used, and said promoter is one or more organic promoters selected from the group consisting of the following compounds: tetramethylthiuram disulfide, tetraethylthiuram disulfide, tetramethylthiuram sulfide, tetramethylthiuram tetrasulfide, 2-mercapto benzothiazole, dibenzothiazole disulfide, N,N'-diisopropyl-2-benzothiazole sulfenamide, N-tert-butyl-2-benzothiazole sulfenamide, N,N-dicyclohexyl-2-benzothiazole sulfenamide, N,O-di(1,2-ethylene)-2- benzothiazole sulfenamide, 1,2-ethylene thiourea, N,N-di-n-butyl thiourea, diphenyl thiourea, dithio-di-n-butyl xanthic acid, diphenylguanidine, di-o-tolylguanidine, triphenylguanidine, and N,O-(1,2-ethylene) thiocarbamyl-N,O-di(1,2-ethylene) sulfenamide.

2. The method according to claim 1, where in said method of contacting said catalyst with elemental sulfur by sublimitation and/or melting comprises heating the mixture of catalyst sample and elemental sulfur to a temperature of 90~130° C., then maintaining at the temperature for 0.5~5 hours, wherein the amount of elemental sulfur used is 50–150 wt % of stoichiometric value.

3. The method according to claim 2, where in the amount of said elemental sulfur used is 90–140 wt % of stoichiometric value.

4. The method according to claim 1, where in said olefin-containing component is one or more selected from pure liquid monoene, diene and polyene, which are linear or branched or cyclic olefin.

5. The method according to claim 4, where in said olefin is selected from the olefins having 5–30 carbon atoms.

6. The method according to claim 1, where in said olefin-containing component contains one or more component(s) selected from alkane, cycloalkane and aromatic hydrocarbon, and the olefin content of said olefin-containing component is 30~100 wt %.

7. The method according to claim 6, where in said olefin-containing component is a fraction oil formed by wax cracking, having a boiling range of 170~350° C. and an olefin content of 50–90 wt %.

8. The method according to claim 1 where in said promoter is dibenzothiazole disulfide and/or tetramethylthiuram disulfide.

9. The method according to claim 1, where in said heating temperature, after the olefin-containing component, elemental sulfur and promoter are mixed, is 130~210° C. and heating time is 0.5~5 hours, and the amount of said promoter used is 10~50 wt % of the amount of elemental sulfur used.

10. The method according to claim 1, where in, in the step of impregnating said elemental sulfur-incorporated catalyst with said product containing sulfurized olefin, the volume amount of the sulfurized-olefin-containing product is 60–150 vol % of the pore volume of said catalyst.

11. The method according to claim 10, where in the amount of said sulfurized-olefin-containing product used is 75~95 vol % of the pore volume of the catalyst.

12. The method according to claim 1, where in said inert atmosphere is an inert atmosphere in static state of 0.1–5 MPa.

13. The method according to claim 1 or 12, where in said inert atmosphere is the atmosphere of Helium, Neon, Argon, Nitrogen, or carbon dioxide.

14. The method according to claim 13, where in said inert atmosphere is Nitrogen atmosphere.

15. The method according to claim 1, where in said heating temperature for treating the catalyst in the inert atmosphere is 150~300° C.

16. The method according to claim 1, where in said heating time for treating the catalyst in the inert atmosphere is 2–5 hours.

* * * * *